Figure 1:
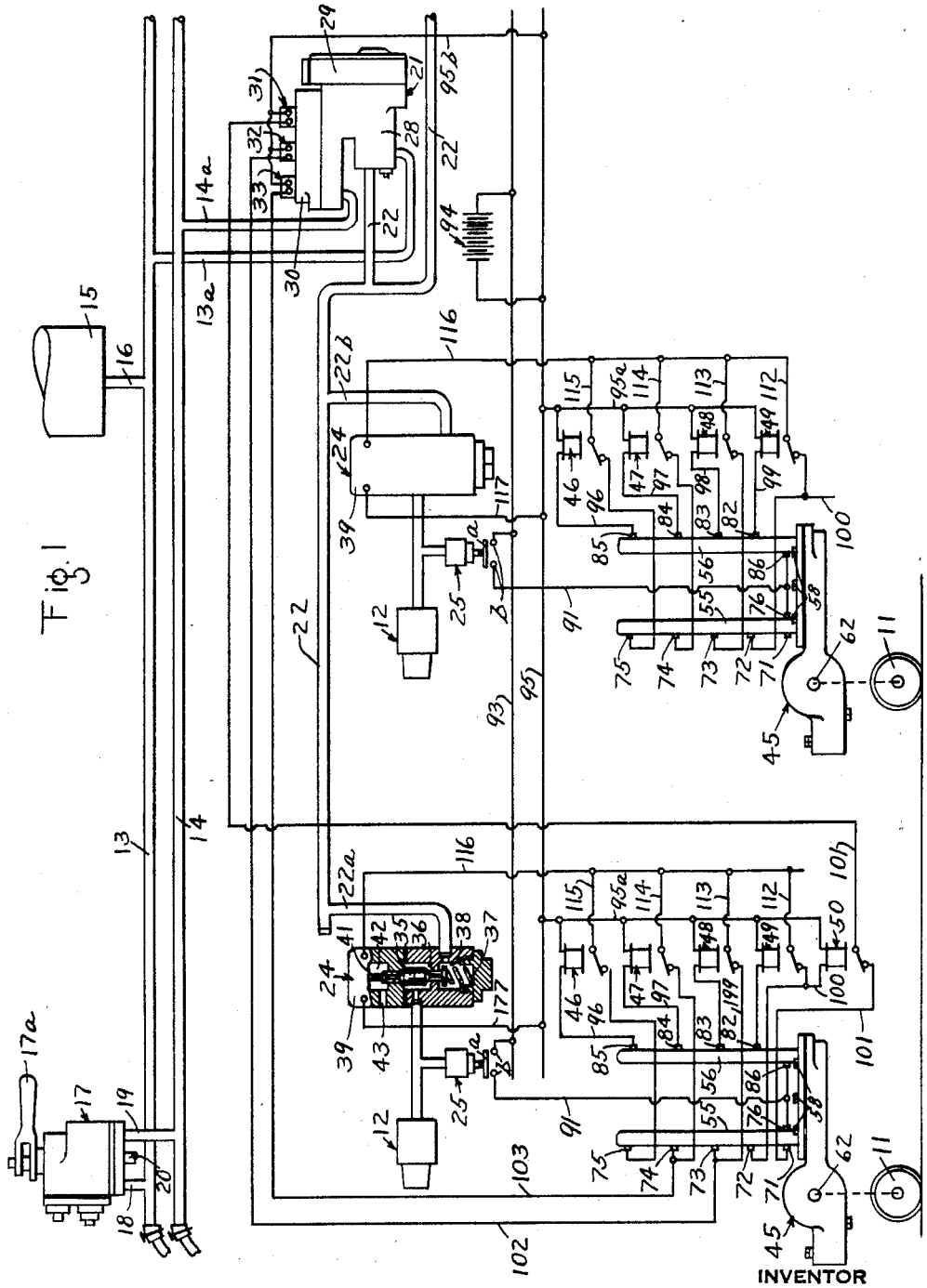

June 15, 1943.  E. P. SEXTON  2,322,065
COMBINATION SPEED GOVERNOR AND DECELEROMETER
Original Filed Aug. 28, 1941  2 Sheets-Sheet 2

INVENTOR
EVERETT P. SEXTON
BY
ATTORNEY

Patented June 15, 1943

2,322,065

UNITED STATES PATENT OFFICE 2,322,065

COMBINATION SPEED GOVERNOR AND DECELEROMETER

Everett P. Sexton, East McKeesport, Pa., assignor to The Westinghouse Air Brake Company, Wilmerding, Pa., a corporation of Pennsylvania Original application August 28, 1941, Serial No. 408,618, now Patent No. 2,306,505, dated December 29, 1942. Divided and this application November 29, 1941, Serial No. 420,933

7 Claims. (Cl. 264—14)

This invention relates to a combination speed governor and decelerometer, the present application being a division of application Serial No. 408,618, filed August 28, 1941 (issued as Patent No. 2,306,505 on December 29, 1942) and assigned to the assignee of the present application.

It is an object of my invention to provide a novel device which is responsive both to the speed and the rate of change of speed of a rotary element.

It is another object of my invention to provide a novel device responsive to the rotational speed of a rotary element and adapted for any desired control purpose.

It is another object of my invention to provide a novel device which is responsive to the rate of change of rotational speed of a rotary element, particularly the rate of rotational deceleration thereof, and adapted for a desired control purpose.

Although my invention may be employed for any desired control purpose, I have illustratively described it hereinafter in connection with a vehicle brake control system of the fluid pressure type. It is accordingly thought desirable to discuss briefly certain fundamentals of brake control in order to demonstrate the utility of my invention in connection therewith.

It is a well known fact that the coefficient of friction between the brake shoes and the rim of railway car wheels increases as the speed of the car or train decreases. In the past it has been customary therefore for the operator of a train to manually decrease the degree of application of the brakes on the cars of the train, as the speed of the train reduces, in order to prevent application of the brakes on the wheels to a sufficient degree to cause locking of the wheels and a consequent sliding thereof. More recently, speed governors of various types have been proposed and employed for automatically effecting a reduction in the degree of application of the brakes associated with the wheels of a train as the speed of the train decreases.

Various devices have also been proposed and provided whereby to recognize the slipping condition of a car wheel and to cause an automatic and rapid release of the brakes associated with the slipping wheels so as to cause restoration of the slipping wheels back to a speed corresponding to car speed without permitting the wheel to actually decelerate to a locked condition and slide.

The terms "slipping" and "sliding" as applied to vehicle wheels in the present application are not synonymous. The term "slipping" refers to the rotation of a vehicle wheel at a speed less than a speed corresponding to car speed at a given instant and the term "sliding" refers to the dragging of a vehicle wheel along a road surface or rail in a locked condition.

When a car wheel slips, it decelerates at an abnormally rapid rate never attained while the wheel is not slipping. The registration of the rotative deceleration of the vehicle wheel at a rate exceeding a certain rate never attained normally while the wheel is not slipping is thus positive indication of the slipping condition of the vehicle wheel.

The novel speed governor and decelerometer disclosed in my present application is adapted to be employed in a brake control equipment for vehicles to control the degree of application of the brakes both in accordance with the speed of the vehicle and in accordance with the rate of rotative deceleration of a slipping wheel so as to prevent the sliding of the wheel.

Figure 2:
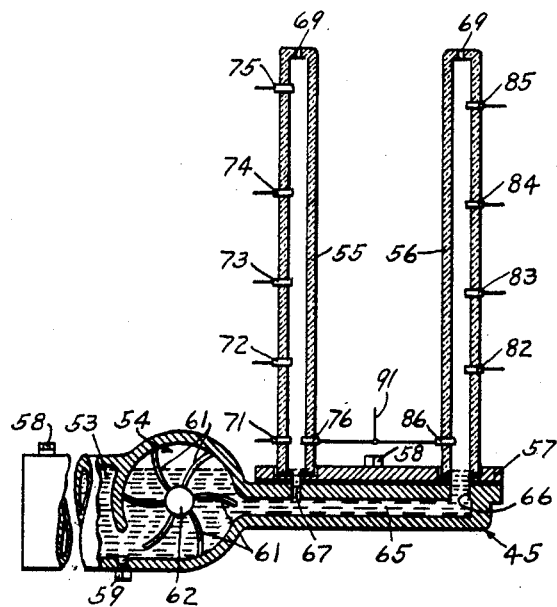

The above objects, and other objects of my invention which will be made apparent hereinafter, are attained by equipment subsequently to be described and shown in the accompanying drawings, wherein Fig. 1 is a diagrammatic view, showing my novel speed governor and decelerometer in connection with a vehicle brake control equipment, and Fig. 2 is an enlarged vertical sectional view of my novel governor and decelerometer device.

Description of equipment

Referring to Fig. 1, the brake control equipment shown is that for a single four-wheel car truck, only one wheel 11 of each wheel and axle assembly of the truck being visible in the drawing. It will be understood that each wheel 11 is fixed on one end of an axle to the opposite end of which a similar wheel, not shown, is fixed, the two wheels and connecting axle being referred to as a wheel and axle assembly or a wheel unit. The term "wheel unit" may refer however to a single wheel only.

The brakes associated with the wheels 11 may be of the conventional clasp type in which the shoes are arranged so as to be applied and released through intervening brake levers and brake rigging, not shown, in response to the supply of fluid under pressure to and the release of fluid under pressure from brake cylinders 12. In the drawings each of the brake cylinders is adapted to operate the brake associated with the wheel and axle assembly in vertical alignment therewith. It should be understood however, that any desired number of brake cylinders may be provided.

For the purposes of my present invention, any suitable type of apparatus may be provided whereby the operator stationed on one unit or car of a train may control the supply and the release of fluid under pressure to and from the brake cylinders on all cars. For simplicity, I have illustrated a simple straight-air type of fluid pressure brake control equipment comprising two train pipes 13 and 14, hereinafter referred to as the supply pipe and the control pipe respectively; a reservoir 15, hereinafter referred to as the main reservoir, which is constantly connected to the supply pipe 13 as through a branch pipe 16; and a manually operated brake valve 17, illustrated as of the self-lapping type, which is connected by branch pipes 18 and 19 to the supply pipe 13 and control pipe 14 respectively.

The fluid pressure brake control equipment may further comprise a differential relay 21 which is connected by a branch pipe 14a to the control pipe 14 and which is responsive to the fluid pressure established in the control pipe 14 to cause fluid under pressure to be supplied from a branch pipe 13a of the supply pipe to a pipe 22 having branches leading to the brake cylinders 12 on the corresponding car. The pipe 22, as shown in Fig. 1, is provided with two branches one of which leads to the brake cylinders 12 for the wheel truck shown in the drawings and a second branch extending in the right-hand direction and leading to the brake cylinders for the wheel truck, not shown, at the opposite end of the car.

Each branch of the pipe 22 is provided with two branches 22a and 22b leading respectively to the two brake cylinders of the corresponding wheel truck.

Interposed in each of the branch pipes 22a and 22b is a magnet valve device 24 the purpose of which will be explained hereinafter.

Associated with each of the brake cylinders 12 and responsive to the pressure therein is a fluid pressure operated switch device 25, hereinafter referred to as the pressure switch.

The brake valve 17 is of the self-lapping type described and claimed in Patent 2,042,112 to Ewing K. Lynn and Rankin J. Bush. Since reference may be had to this patent for a detailed description of the structure and operation of the brake valve, it will be described only functionally herein. With the brake valve handle 17a in normal brake release position, communication is established by the brake valve through which fluid under pressure is exhausted from the control pipe 14 through an exhaust port and pipe 20 at the brave valve. When the brake valve handle 17a is shifted in a horizontal plane out of its brake release position into a so-called application zone, the brake valve mechanism supplies fluid under pressure from the supply pipe 13 to the control pipe 14, the pressure established in the control pipe being substantially proportional to the degree of displacement of the brake valve handle out of its brake release position.

If the pressure in the control pipe 14 tends to reduce for any reason, such as leakage, the brake valve mechanism operates automatically to continue to supply fluid under pressure thereto to maintain a pressure in the control pipe corresponding to the position of the brake valve handle. This pressure-maintaining feature of the brake valve will be referred to hereinafter.

The differential relay valve device 21 is of the type described and claimed in Patent 2,140,624 to E. E. Hewitt. Since reference may be had to the patent, the device is shown only in outline form and will be described only briefly herein. The differential relay valve device 21 comprises a relay valve section 28, a diaphragm section 29, and a magnet valve section 30. The relay valve section 28 comprises a self-lapping relay valve apparatus including a supply valve and a release valve. The supply valve controls the supply of fluid under pressure from pipe 13a to the brake cylinder pipe 22. The release valve controls the exhaust of fluid under pressure from the brake cylinder pipe 22 to atmosphere.

The diaphragm section 29 comprises a plurality of coaxially disposed diaphragms of successively increasing or decreasing effective pressure areas, the larger of the diaphragms being adjacent the relay valve section 28 and subject on one side to the pressure in the brake cylinder pipe 22.

Fluid under pressure from the control pipe 14 and its branch pipe 14a is supplied selectively to the chambers formed between two successive diaphragms, under the control of corresponding magnet valve devices 31, 32 and 33 of the magnet valve section 30.

A chamber formed at the outer face of the smallest diaphragm is constantly subject to the pressure in the control pipe 14.

The diaphragms of the diaphragm section 29 are effective individually or collectively to exert a force to operate the valves of the relay valve section 28 to cause a supply of fluid under pressure to the brake cylinder pipe 22, the valves being restored to a lapped condition when the force of the brake cylinder pressure on the one side of the largest diaphragm balances the force exerted in the opposite direction by the control pipe pressure acting on the diaphragms. Thus varying ratios between the pressure established in the brake cylinders and that established in the control pipe 14 may be attained depending upon the relation or ratio between the effective pressure areas of the several diaphragms. In the following description of the operation of the equipment it will be assumed that there are four diaphragms having respective effective pressure areas of 10, 8, 6 and 4 square units of area.

It will be understood, therefore, without out further description that when the magnet windings of both magnet valves 32 and 33 are energized while that of the magnet winding of the magnet valve 31 is deenergized, the differential relay 21 is conditioned to supply fluid at a pressure substantially equal to that in the control pipe to the brake cylinders.

When only the magnet winding of the magnet valve 32 is energized, the differential relay is conditioned to supply fluid to the brake cylinders at a pressure which is only eighty percent of that established in the control pipe.

When the magnet windings of all of the magnet valves are deenergized, the differential relay 21 is conditioned to supply fluid to the brake cylinders at a pressure which is sixty percent of that established in the control pipe.

When the magnet winding of only the magnet valve 31 is energized, the differential relay 21 is conditioned to supply fluid at a pressure to the brake cylinders at pressure which is only forty percent of that established in the control pipe.

It should be understood that the actual pressure in the brake cylinders will vary in response to variation of the control pipe pressure but that the ratio of the pressure in the brake cylinders and that in the control pipe never varies for a given condition of the differential relay 21.

The magnet valves 24 are identical and accordingly only one is shown in section and will be described. The magnet valve 24 is of the double beat type having a double beat valve 35 contained in a chamber 36 and biased to an upper seated position by a coil spring 37 contained in a chamber 38. Upon energization of a magnet winding or solenoid 39 a plunger 41 is actuated downwardly to shift the double beat valve 35 to a lower seated position.

In its upper seated position, valve 35 establishes communication from one section of the branch pipe 22a or 22b to the other section leading to the corresponding brake cylinder by way of the chambers 38 and 36. In its lower seated position, valve 35 closes such communication and establishes an exhaust communication connecting the chamber 36 to a chamber 42 constantly open to atmosphere through a relatively large exhaust port 43.

Thus, when the magnet winding 39 of the magnet valve 24 is deenergized, fluid under pressure may be supplied to the corresponding brake cylinder 12 and released therefrom by operation of the differential relay 21. When the magnet winding 39 of the magnet valve 24 is energized, the supply of fluid under pressure to the brake cylinder 12 is cut off and fluid under pressure is released at a rapid rate to atmosphere through the exhaust port 43 independently of the differential relay 21.

The pressure switches 25 are preferably of the snap-acting type described and claimed in Patent 2,096,492 to E. E. Hewitt. Since reference may be had to the patent just mentioned, a brief functional description is believed to be sufficient for purposes of the present application. Each of the pressure switches comprises a movable contact a and two stationary contacts b adapted to be bridged by the movable contact a. The movable contact a is biased to an open position out of engagement with the associated contacts b as long as the pressure in the corresponding brake cylinder 12 remains below a certain low pressure such as five pounds per square inch. When the pressure in the brake cylinder exceeds such critical pressure, the contact a is snapped suddenly into engagement with the associated contacts b which position will hereinafter be referred to as the closed position of the pressure switch. Thereafter, when the pressure in the brake cylinder reduces below five pounds per square inch, the contact a is snapped suddenly to the open position.

In accordance with my invention, the brake control equipment shown in Fig. 1 further comprises a so-called governor device 45 and a plurality of relays 46, 47, 48, 49 and 50 in connection with one of the wheel units, illustrated as the left-hand wheel unit of the wheel truck shown, and a governor device 45 and relays 46, 47, 48, and 49 in connection with each remaining wheel unit of a particular car.

Referring to Fig. 2, each governor device comprises a casing including a portion formed to provide a fluid reservoir or chamber 53, a portion for receiving a pump 54 shown as of the centrifugal type, and a laterally extending portion on which two vertically extending tubes 55 and 56 of glass or porcelain material are supported. The glass tubes 55 and 56 may be cemented at their lower ends in a metallic flange 57 adapted to be secured as by a plurality of screws 58 to the remaining portion of the casing containing the reservoir 53 and pump 54. The reservoir 53 is provided with suitable filling opening having a screw plug 58 and a drain opening having a screw plug 59.

In accordance with my invention, fluid of high specific gravity, such as mercury, is admitted through the filling opening to fill the reservoir and pump chamber substantially to the level indicated.

The pump 54 may comprise a plurality of blades 61 secured to a rotary shaft 62 which extends to the exterior of the casing and which is adapted to be rotated in accordance with the speed or rotation of the corresponding wheel or wheel unit by any desired type of drive mechanism. Upon rotation of the blades 61, mercury is expelled from the pump chamber into a laterally extending passage 65 and rises in the tubes 55 and 56 which are open at the lower ends thereof to the passage 65. The level to which the mercury in the tubes 55 and 56 is raised corresponds substantially to the rotational speed of the vehicle wheel driving the pump 54. That is, the mercury rises in the tubes until the weight of the column in each tube balances the force exerted by the pump which is in turn substantially proportional to the rotational speed of the vehicle wheel driving the pump.

The tube 56 is open at its lower end through a relatively large port 66 whereas the lower end of the tube 55 is open to the passage 65 through a relatively smaller or restricted port 67. The nature and the design of the ports 66 and 67 is such that the level of the mercury in the tube 56 is adjusted instantaneously in accordance with the rotational speed of the vehicle wheel driving the pump whereas the level of the mercury in the tube 55 is adjusted according to the change in the rotational speed of the vehicle wheel driving the pump only if the rate of change of speed does not exceed a certain value, such as eight miles per hour per second.

In view of the fact that a vehicle wheel never attains a rate of deceleration of eight miles per hour per second unless the wheel is slipping, it will be seen that as long as the corresponding vehile wheel does not slip, the level or height of the column in the two tubes will rise and fall in unison with variations in wheel speed. If the wheel driving the pump should slip, however, the rate of deceleration of the wheel greatly exceeds eight miles per hour per second and thus the height of the mercury column in the two tubes does not fall in unison, the column in the tube 56 falling rapidly in correspondence with the reduction in speed of the wheel whereas the height of the mercury column in tube 55 falls merely in accordance with a rate of deceleration of eight miles per hour per second as limited by the size of the restricted port or choke 67.

In order to prevent the development of pressure in the upper ends of the tubes 55 and 56 as the mercury rises in the tubes, each of the tubes is provided with a breather port or opening 69.

Suitably sealed or cemented in openings provided in the wall of the tube 55 are a plurality of vertically spaced contacts 71, 72, 73, 74 and 75. Also cemented in the tube 55 at the level of the contact 71 is an additional contact 76. The contacts 71 to 75 may be vertically spaced in any desired position so as to be engaged or contacted by the mercury within the tube at corresponding different rotational speeds of the vehicle wheel. For purposes of illustration, it will be assumed that the level of the mercury in the tube 55 reaches the contact 71 when the wheel rotates at a speed corresponding to two miles per hour, reaches the level of the contact 72 when the wheel rotates at a speed of twenty miles per hour, reaches the level of the contact 73 when the wheel rotates at a speed of forty miles per hour, reaches the level of the contact 74 when the wheel rotates at a speed of sixty-five miles per hour and reaches the level of contact 75 when the wheel rotates at a speed of ninety miles per hour.

Also suitably cemented in holes provided in the walls of the tube 56 are a series of vertically spaced contacts 82, 83, 84, 85 and 86.

The contact 86 is at the same level as the contacts 71 and 76 of the tube 55 and is thus engaged by the mercury in the tube 56 when the wheel rotates at a speed of two miles per hour.

The contact 82 is so positioned vertically in the tube 56 as to be reached by the mercury in the tube whenever the speed of rotation of the wheel reaches eighteen miles per hour. Contacts 83, 84 and 85 are so positioned as to be reached by the level of the mercury in the tube when the wheel reaches speeds of thirty-seven, sixty and eighty-five miles per hour respectively.

The reason for the difference in the elevational positions of the contacts 72 to 75 with respect to that of the contacts 82 to 85 will be made apparent hereinafter.

The contacts 76 and 86 of each governor device are connected by a corresponding wire 91 including the contacts of a corresponding pressure switch 25 to a bus wire 93 extending the length of the car to which the positive terminal of a source of current such as a storage battery 94 is connected. The negative terminal of the battery 94 is connected to a similar bus wire 95 which extends the length of the car. The wires 93 and 95 are hereinafter designated the positive battery wire and the negative battery wire respectively.

Relays 46 to 50 are conventional or standard relays of the neutral type. Each relay has a single contact, known as a back-contact, which is biased to a closed position when the winding of the relay is deenergized and which is actuated to an open position when the winding of the relay is energized.

The windings of the relays 46 is serially arranged in a wire 96 which is connected at one end to the contact 85 and at the other end to a branch wire 95a of the negative battery wire 95.

The winding of the relay 47 is serially arranged in a wire 97 which is connected at one end to the contact 84 and at the opposite end to the wire 95a.

The winding of the relay 48 is serially arranged in a wire 98 connected at one end to the contact 83 and at the opposite end to the wire 95a.

The winding of the relay 49 is serially arranged in a wire 99 connected at one end to the contact 82 and at the other end to the wire 95a.

The winding of the relay 50 is serially arranged in a wire 100 connected at one end to the contact 72 and at the other end to the wire 95a.

It will now be apparent that when the mercury in the tube 56 connects contact 86 to the contacts 82, 83, 84 and 85, a circuit is completed for energizing the windings of the relays 49, 48, 47 and 46, respectively. Similarly, when the mercury in the tube 55 connects contacts 76 and 72, the winding of the relay 50 is energized.

The contact 71 of one governor, illustrated as the left-hand governor in Fig. 1, for each car is connected by a wire 101 including in series relation therein the back-contact of the relay 50 and the winding of the magnet valve 31 of the differential relay valve device 21 to a branch wire 95b of the negative battery wire 95. It will thus be seen that when the contact of the relay 50 is in its dropped-out or closed position when the level of the mercury column in tube 55 is above the contact 71, the circuit is completed for energizing the magnet winding of the magnet valve 31, assuming that the pressure switch 25 is in closed position.

The contact 73 of the left-hand governor 45 is connected by a wire 102 including in series relation therein the magnet winding of the magnet valve 32 of the differential relay valve device 21 to the branch wire 95b of the negative battery wire 95. If the corresponding pressure switch 25 is closed, the connection of the contacts 71 and 73 by the mercury column within the tube 55 is thus effective to complete a circuit for energizing the magnet winding of the magnet valve device 32.

The contact 74 of the left-hand governor device 45 is connected by a wire 103, including in series relation therein the magnet winding of the magnet valve device 33 of the differential relay valve 21, to branch wire 95b of the negative battery wire 95. Thus, if the corresponding pressure switch 25 is closed, the connection of the contacts 71 and 74 by the mercury in the tube 55 is effective to complete a circuit for energizing the magnet winding of the magnet valve 33.

The contacts 72, 73, 74 and 75 of each governor device 45 are connected by wires 112, 113, 114 and 115 including in series relation therein the back-contact of the relays 49, 48, 47 and 46 respectively, to a common wire 116 that is, in turn, connected to one terminal of the magnet winding 39 of the magnet valve 24 for the corresponding wheel unit. The other terminal of the magnet winding 39 of the magnet valve 24 is connected by a wire 117 to the negative battery wire 95.

It will thus be seen that if the height of the mercury columns in the two tubes 55 and 56 is the same and drops in unison, the circuit will not be completed for energizing the magnet winding 39 of the magnet valve 24 associated therewith. If, however, the height of the mercury column in the tube 56 drops at a faster rate than that in the column in the tube 55, as is the case when the corresponding wheels or wheel unit slips, the contacts of one or more of the relays 46, 47, 48 and 49 will be restored to the dropped-out or closed position thereof while the mercury in the tube 55 still connects the contact 76 to one or more of the contacts 75, 74, 73 and 72.

A circuit for energizing the magnet winding 39 of the magnet valve 24 is thus established when the wheels of the corresponding wheel unit slip.

*Operation of equipment*

Let it be assumed that a car or train equipped with the brake control equipment shown in Fig. 1 is traveling along the road under power, with the brakes released, at a speed in excess of ninety miles per hour and that the operator desires to bring the car or train to a stop. To do so the operator first shuts off the propulsion power and then shifts the brake valve handle 17a out of its brake release position an amount corresponding to the desired degree of application of the brakes.

The control pipe 14 is accordingly charged to a corresponding pressure, for example fifty pounds per square inch. The differential relay valve device 21 which is conditioned in the manner presently described operates in response to the pressure established in the control pipe to cause fluid under pressure to be supplied to the brake cylinders 12, the ratio of the pressure established in the brake cylinders with respect to the pressure established in the control pipe depending upon the condition of the differential relay 21.

With the vehicle traveling in excess of ninety miles per hour, circuits are accordingly completed for energizing the magnet windings of the magnet valves 32 and 33 of the differential relay 21 upon the closure of the pressure switch 25 associated with the corresponding control governor 45. As previously indicated, the pressure switch 25 closes whenever the pressure of the fluid supplied to the brake cylinders exceeds five pounds per square inch. Thus, substantially at the instant that the application of the brakes is initiated, the differential relay valve device 21 is automatically conditioned in accordance with the speed of travel of the car or train.

It will be understood that the magnet windings of the magnet valves 32 and 33 are energized because the mercury column in the tube 55 connects the contact 76 to the contacts 74 and 73 respectively, with the car or train traveling at a speed in excess of ninety miles per hour. At the same time, the mercury column in the tube 55 connects the contacts 72 and 71 to contact 76. Thus the winding of the relay 50 is energized and its back-contact actuated to its open position so that although the mercury column in the tube 55 connects the contact 71 to the contact 76 the circuit for energizing the magnet winding of the magnet valve 31 is interrupted at the contact of the relay 50.

It will accordingly be seen that upon application of the brakes under the circumstances assumed, the differential relay valve device 21 is conditioned to cause fluid under pressure to be supplied to the brake cylinders 12 on the car to establish a pressure therein corresponding or substantially equal to the pressure established in the control pipe 14 so that the brakes associated with the vehicle wheel are applied to a corresponding degree.

The pressure established in the brake cylinders 12 remains constant thereafter, assuming that the operator does not change the pressure in the control pipe and that none of the wheels slip, until such time as the speed of the vehicle or the car or train reduces below sixty-five miles per hour at which time the mercury column in the tube 55 descends below the contact 74 and thus interrupts the circuit for energizing the magnet winding of the magnet valve 33 of the differential relay 21.

With the magnet winding of the magnet valve 32 thus energized and the magnet windings of the magnet valves 31 and 33 deenergized, the condition of the differential relay 21 is so changed so as to effect a reduction of the pressure in the brake cylinders at a controlled rate until the pressure remaining in the brake cylinders attains a value which is eighty percent of that established in the control pipe 14. The pressure in the brake cylinders is not reduced instantaneously to eighty percent of the pressure in the control pipe when the speed of the car or train reduces below sixty-five miles per hour, but is reduced at a controlled rate so that actually the pressure in the brake cylinders is not reduced to eighty percent of that in the control pipe until some time after the instant that the speed of the car or train reduces below sixty-five miles per hour.

When the speed of the car or train reduces below forty miles per hour and the level of mercury column in tube 55 descends correspondingly below the contact 73, the circuit for energizing the magnet winding of the magnet valve 32 of the differential relay 21 is interrupted. Differential relay 21 is thus again varied in condition so as to effect a further reduction of the pressure in the brake cylinders on the car to a value which is sixty percent of that established in the control pipe. As in the previous instance the reduction of the pressure in the brake cylinders does not take place instantaneously but at a controlled rate so that the pressure in the brake cylinders does not reduce to a value of sixty percent of the control pipe pressure until some time after the instant that the speed of the car or train reduces below forty miles per hour.

When the speed of the car or train reduces below twenty miles per hour in response to the application of the brakes so that the height of the mercury column in the tube 55 descends correspondingly below the contact 72, the circuit for energizing the relay 50 is interrupted. The back-contact of the relay 50 is thus restored to its dropped-out or open position completing the circuit for energizing the magnet winding of the magnet valve 31 of the differential relay 21.

The condition of the differential relay 21 is thus changed so as to cause the differential relay to effect a further reduction of the pressure of the brake cylinders on the car to a value which is only forty percent of that established in the control pipe 14. As in previous instances, the change in the condition of the differential relay 21 causes reduction of brake cylinder pressure at a controlled rate, the ultimate value to which the pressure in the brake cylinder is reduced being attained some time after the instant that the speed of the car reduces below twenty miles per hour.

When the car or train comes to a complete stop and level of the mercury column in the tube 55 descends correspondingly below the contacts 71 and 76, the circuit for energizing the magnet winding of the magnet valve 31 of the differential relay 21 is interrupted. The differential relay 21 is thus restored to a condition for establishing a pressure in the brake cylinder which is sixty percent of that established in the control pipe 14. The differential relay 21 accordingly operates to supply fluid under pressure to the brake cylinders to effect a corresponding increase of the pressure therein.

It will thus be seen that the degree of application of the brakes on the wheels of the car is automatically reduced in steps to a certain low value and then, when the car comes to a complete stop, is again increased to a certain value higher than the certain low value in order to establish an adequate degree of brake application to hold the car or train against creepage on a grade.

Obviously, the operator may vary the pressure in the control pipe 14 while a car or train is being brought to a stop, in which case the pressure in the brake cylinders 12 will be correspondingly varied by operation of the differential relay 21.

However, for any particular speed range or condition of the differential relay 21, the ratio between the pressure established in the brake cylinders and that in the control pipe remains the same.

When it is desired to release the brakes prior to again starting the car or train, the operator merely restores the brake valve handle 17a to its brake release position. The pressure in the control pipe 14 is accordingly reduced to atmospheric pressure and the differential relay 21 on each car is accordingly operated to exhaust fluid under pressure from the brake cylinders of that car to effect complete release of the brakes.

When the fluid pressure in the brake cylinders reduces below five pounds per square inch, the pressure switch 25 associated with each brake cylinder is restored to its open position. Thus until the brakes are again applied, the magnet windings of the magnet valves 31, 32, and 33 of the relay valve device 21 cannot be energized regardless of the subsequent speed of travel of the car or train. Thus unnecessary drainage of current from battery 94 is prevented. Although I have shown a pressure switch for each brake cylinder obviously only one pressure switch may be used to control the connection of wire 91 from each governor to the positive battery wire 93. Moreover such pressure switch may be controlled according to the pressure in the control pipe instead of brake cylinder pressure.

In the previous operation it was assumed that none of the wheels on the car slipped. In the event that the wheels of one or more wheel units on the car begin to slip during an application of the brakes a further operation occurs which will now be described. Let it be assumed that the wheels 11 of the right-hand wheel unit in Fig. 1 begin to slip when the application of the brakes is initiated while the train is traveling in excess of ninety miles per hour. In such case the level of the mercury column in the tube 56 of the corresponding governor device 25 descends rapidly to below the contact 85 while, due to the restricted port 67 at the bottom of the tube 55, the level of the mercury column in the tube 55 descends at a lesser rate and thus remains above the contact 75 for a time. Since contacts 75 and 85 are separated in level by a difference corresponding to five miles per hour, it will be apparent that substantially at the instant that the wheels begin to slip, the contact of the relay 46 is restored to its dropped-out or closed-position due to the interruption of the energizing circuit for the magnet winding for the relay 46 and a circuit is thereby completed for energizing the magnet winding 39 of the corresponding magnet valve 34. This circuit extends from the positive battery wire 93 by way of the wire 91 including the contacts of the pressure switch 25, contact 76, the mercury column in the tube 55, contact 75, wire 115 including the back-contact of the relay 46, wire 116, magnet winding 39 of the magnet valve 24 and wire 117 to the negative battery wire 95.

The magnet valve 24 corresponding to the slipping wheels is accordingly operated to successively cut-off communication through the branch pipe 22b to the brake cylinders 12 and effect a rapid exhaust of fluid under pressure from the brake cylinders.

Due to the instantaneous and rapid reduction of the pressure in the brake cylinders applying the brake on the slipping wheels, the wheels promptly cease to decelerate at a slipping rate and begin to accelerate back toward a speed corresponding to car speed.

In most instances, the circuit for energizing the magnet winding 39 of the magnet valve 24 will be maintained as the speed of the slipping wheel reduces due to the fact that the mercury column in the tube 56 drops so much faster than the mercury column in the tube 55 that the mercury column in the tube 56 will descend below the next lower contact, such as the contact 84, before the mercury column in tube 55 descends below the preceding contact 75 in the tube 55. Thus, although the mercury columns in the two tubes may reduce below the contacts 75 and 85, the circuit for energizing the magnet winding 39 of the magnet valve 24 will be maintained by way of contact 74 and wire 114 including the back-contact of the relay 47, the magnet winding of which has previously been deenergized due to level of the mercury column in the tube 56 descending below the contact 84.

If, however, the level of the mercury column in tube 56 does not descend below the next lower contact before the height of the mercury column in the tube 55 descends below the preceding upper contact in the tube 55, it may happen that the circuit for energizing the magnet winding 39 of the magnet valve 25 will be momentarily deenergized and then reenergized due to the continuing fall of the mercury columns.

It will be apparent, however, that if a sufficient number of contacts are provided in the tubes, and corresponding relays are provided operating similarly to the relays 46, 47, 48, and 49, the magnet winding 39 will be energized continuously during the slipping interval. I have shown only a relatively few number of contacts in the tubes for simplicity but it will be understood that any desired number may be provided. For example, a sufficient number of contacts may be provided in the tubes 55 and 56 to correspond to intervals of ten miles per hour in the speed of the corresponding wheels instead of the illustrated speed intervals.

Upon the acceleration of the slipping wheels back toward the corresponding car speed, the level of the mercury column in the tube 56 is rapidly raised whereas the level of the mercury column in tube 25 is less rapidly raised due to the restricted port 67. It will thus be apparent that sometime before the slipping wheels are restored fully to a speed corresponding to car speed and while they are accelerating back toward car speed, the level of the mercury columns in the two tubes 55 and 56 will be the same. The height of the mercury column in the tube 56 may even rise above that of the mercury column in the tube 55. In any case, whenever the two mercury columns are substantially the same height or whenever the mercury column in tube 56 is higher than that in tube 55 it is impossible for any of the several circuits to be established through the contacts of the relays 46, 47, 48 and 49 to effect energization of the magnet winding 39 of the magnet valve 24. Thus, the magnet winding 39 will be deenergized and the magnet valve returned to its position restoring communication through the pipe 22b. Fluid will accordingly be resupplied to the brake cylinder 12 to establish a pressure therein determined by the condition of the differential relay 21.

It should be apparent that if, after the speed of the car is reduced below ninety miles per hour and is still above sixty-five miles per hour, a slipping of the wheels again occurs, the descent of the mercury column in tube 56 below contact 84 while the mercury column in the tube 55 remains above the contact 74 will complete a circuit for energizing the magnet winding of the magnet valve 24 to effect an instantaneous and rapid exhaust of the fluid under pressure from the brake cylinder 12.

Similarly, if slipping of the wheels occurs when the car is traveling at a speed between sixty-five and forty miles per hour, the descent of the mercury column in tube 56 below the contact 83 while the mercury column in the tube 55 remains above the contact 73 establishes a circuit by way of the back-contact of the relay 48 for energizing the magnet winding 39 of the magnet valve 24.

Similarly, if slipping of the wheels occurs when the car is traveling at a speed less than forty and greater than twenty miles per hour, the descent of the mercury column in the tube 56 below the contact 82 while the mercury column in the tube 55 remains above the contact 72 causes a circuit to be established by way of the contact of the relay 48 for energizing the magnet winding 39 of the magnet valve 24.

The operation of the governor 45 controlling the magnet valves 31, 32 and 33 of the differential relay 21 in the event that the corresponding wheels slip is the same as that just described for the governor 45 of the right-hand wheel unit. Due to the reduction in the speed of the slipping wheels, however, the level of the mercury column in the tube 55 may reduce momentarily below the level corresponding to the actual speed of travel of the car. However, since it is almost instantly restored to the level corresponding to the speed of the car the momentary change in the condition of the differential relay 21 which might thus occur is not objectionable.

Although the wheel truck at the opposite end of the car to that shown in Fig. 1 is not shown, it will be understood that the brakes associated with each wheel unit of such truck are adapted to be controlled in accordance with the speed of the car by operation of the differential relay 21. It will also be understood that the governor device 45 for each of the wheel units of such truck operates in exactly the same manner as described for the right-hand wheel unit in Fig. 1 to effect automatically the instantaneous and rapid release of the brakes when the wheels of a wheel unit begin to slip for the purpose of preventing the sliding of the wheels.

While I have shown a magnet valve 24 for controlling the supply and release of fluid under pressure to and from only one brake cylinder, it will be obvious that one magnet valve 24 may be arranged to control the supply and release of fluid under pressure to and from all the brake cylinders of a single wheel truck or plurality of wheel trucks. Moreover the several governor devices may be arranged in parallel so that the single magnet valve may be controlled by any one governor device 45 of a plurality on a car.

*Summary*

Summarizing, it will be seen that I have disclosed a novel equipment for controlling the brakes associated with the wheels of a car or train in accordance with the speed of travel of the car or train and adapted also to effect an instantaneous and rapid reduction in the degree of application of the brakes associated with individual wheel units when slipping of the wheels of such wheel units occur for the purpose of preventing the sliding of the wheels.

It will be seen that I have disclosed also a novel governor device including a pump for supplying mercury to two vertically extending tubes to a level corresponding to the speed of rotation of a vehicle wheel or wheel unit. The height of the mercury column in one tube is adapted to rise and fall at all times substantially in accordance with the rotational speed of the corresponding wheel unit whereas the height of the mercury column in the other tube is prevented from rising or falling at a rate exceeding a certain rate less than that permissible in the said one tube.

As long as both mercury columns fall in unison, the governor device operates solely as a speed governor to control the degree of application of the brakes on the car or train in accordance with the speed of the vehicle. If the wheels begin to slip, the mercury column in the said one tube falls more rapidly than that in the other tube and such disparity in the height of the mercury columns in the two tubes is arranged to cause an instantaneous and rapid reduction in the degree of application of the brakes associated with the corresponding wheel unit which ceases when the two mercury columns are again at the same height.

It will also be seen that I have provided a novel arrangement for reducing the degree of application of the brakes on a car or train in accordance with the reduction in the speed of travel of the car or train to a certain low value and then, after the car or train has come to a complete stop, effecting automatically an increase in the degree of application of the brakes to a certain higher degree.

Having now described my invention, what I claim as new and desire to secure by Letters Patent is:

1. Apparatus for registering the rate of change of rotational speed of a rotary element, comprising two vertically extending tubes, a pump operated in accordance with the rotational speed of the rotary element for impelling a current-conducting liquid to different levels in said tubes, substantially in proportion to variation in the speed of the rotary element, means restricting the rate of change in the level of the liquid in one of said tubes to a certain rate lower than the permissible rate of change in the level of the liquid in the other tube, and means responsive only to a differential in the levels of the liquid in the tubes exceeding a certain value.

2. Vehicle wheel slip detecting means comprising two vertically extending tubes, a pump operated in accordance with the rotational speed of a vehicle wheel for impelling liquid to a height in said tubes corresponding substantially to the speed of the vehicle wheel, means preventing the fall of the liquid in one of said tubes at a rate corresponding to a slipping rate of reduction in the speed of the vehicle wheel whereby when the wheel slips the level of the liquid in the said one tube falls at a lesser rate than the level of the liquid in the other tube, and means responsive to a predetermined differential in the levels of the liquid in the two tubes.

3. A device for registering the rate of rotative deceleration of a rotary element comprising two vertically extending tubes, a pump operated in accordance with the rotational speed of the rotary element for causing a liquid to rise and fall within said tubes to a height corresponding substantially to the rotational speed of the rotary element, means for restricting the rate of fall of liquid in one of said tubes to a lesser rate than that permitted in the other of said tubes whereby, if the rate of rotative deceleration of the rotary element exceeds a certain rate, the level of the liquid in the said other tube falls at a faster rate than that in the said one tube, and means responsive to a certain difference in the levels of liquid in the two tubes.

4. Apparatus for registering the rate of rotative deceleration of a rotary element, comprising two vertically extending tubes, a pump operated in accordance with the rotational speed of the rotary element for causing a current-conducting liquid to rise or fall within said tubes to a height corresponding substantially to the rotational speed of the rotary element, means for restricting the rate of fall of the liquid in one of said tubes to a lesser rate than that in the other of said tubes whereby when the rotary element decelerates rotatively at a rate exceeding a certain rate the level of the liquid in the said other tube falls at a faster rate than that in the said one tube, said one tube having a plurality of contacts arranged in vertically spaced relation and in a manner to be engaged or disengaged by the liquid within the tube in accordance with the level of the liquid, said other tube having a plurality of contacts vertically spaced and so arranged as to be engaged by the liquid within said other tube according to the level of the liquid, and means controlled jointly according to the cooperation of the liquid in each of said tubes with the corresponding contacts for registering the differential in the levels of the liquid within the tubes and consequently the rotative deceleration of the rotary element at a rate exceeding said certain rate.

5. A device for indicating the rotational speed of a rotary element and also the rate of change of speed of the rotary element comprising two vertically extending tubes of transparent material, a pump operated in accordance with the rotational speed of the rotary element for causing a liquid to rise or fall within said tubes to a height substantially proportional to the rotational speed of the rotary element, means for restricting the rate of fall of liquid in one of said tubes to a rate less than that permitted in the other of said tubes whereby upon the rotative deceleration of the rotary element at a rate exceeding a certain rate the level of the liquid in the other of said tubes falls at a faster rate than that in the said one tube, the actual speed of the rotary element being indicated when the liquid in both of said tubes is at the same level.

6. Apparatus for registering the rate of change of speed of a rotary element, said apparatus comprising two vertically extending tubes, container means having a supply of liquid therein, means for impelling liquid from said container means vertically upward in said tubes to levels corresponding substantially to the rotational speed of the rotary element, means for preventing a change in the level of the liquid in one of said tubes as rapidly as in the other of said tubes, and means controlled in accordance with the relative levels of the liquids in the two tubes.

7. Apparatus for registering the rate of change of speed of a rotary element, said apparatus comprising two vertically extending tubes, container means having a supply of liquid therein, means for causing liquid from said container means to rise and fall in said tubes to levels corresponding substantially to the rotational speed of the rotary element, means for limiting the change in the level of the liquid in one tube to a certain maximum rate corresponding to one certain rate of change of rotational speed of rotary element, the liquid in the other of said tubes rising and falling at all times at a rate corresponding to the rate of change of speed of the rotary element, and means actuated when the difference in the levels of the liquid in said tubes exceeds a certain amount.

EVERETT P. SEXTON.